Jan. 23, 1940.   R. H. IMHOFE   2,188,082
BUMPER FOR VEHICLES
Filed June 22, 1937
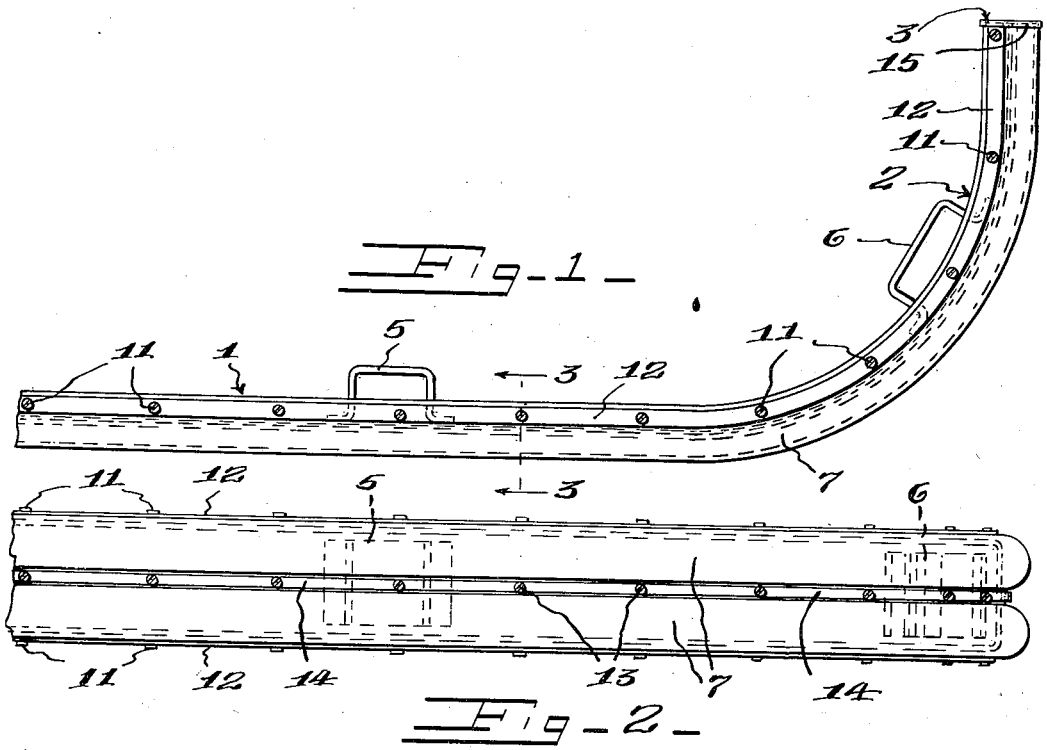
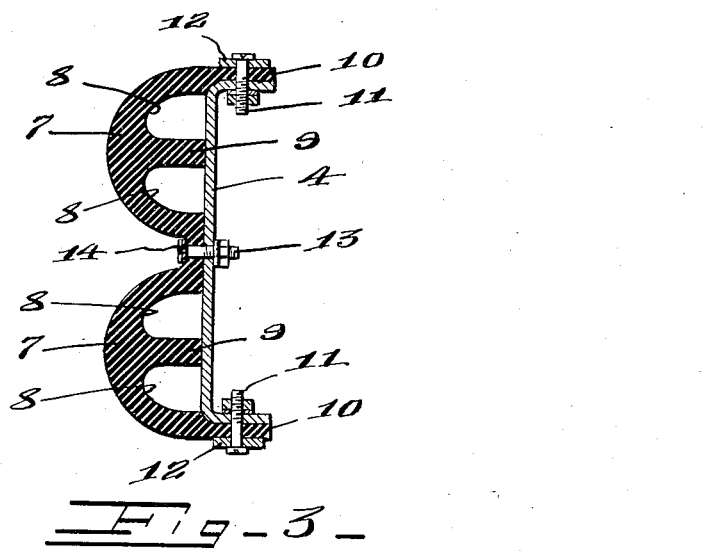
INVENTOR.
BY Robert H. Imhofe
Bodell & Thompson
ATTORNEYS.

Patented Jan. 23, 1940

2,188,082

UNITED STATES PATENT OFFICE 2,188,082

BUMPER FOR VEHICLES

Robert H. Imhofe, Canastota, N. Y., assignor to Rex-Watson Corporation, Canastota, N. Y., a corporation of New York Application June 22, 1937, Serial No. 149,709

2 Claims. (Cl. 293—55)

This invention relates to bumpers for motor vehicles, and particularly for buses and the like, and more particularly as a rear bumper for buses, although the bumper is capable of use in other situations.

It has for its object a bumper consisting of a metal strip or backing and a bumper element of a non metallic resilient material, as rubber, mounted on the metallic backing and secured thereto and formed hollow or with one or more channels opening toward the backing.

It further has for its object a bumper consisting of a metallic backing and a bumper element of a non-metallic resilient material, as rubber, formed with channels opening toward the backing with the flanges lapping the lengthwise edges of the backing and secured thereto and also secured to the backing intermediate of the longitudinal edges of the bumper element and the backing.

The invention consists in the novel features and in the combinations and constructions hereinafter set forth and claimed.

In describing this invention, reference is had to the accompanying drawing in which like characters designate corresponding parts in all the views.

Figure 1 is a fragmentary plan view of a bumper embodying this invention.

Figure 2 is an elevation looking upwardly in Figure 1.

Figure 3 is an enlarged sectional view on line 3—3, Figure 1.

The bumper here illustrated is particularly designed for the rear bumper of buses, and includes a transversely extending portion 1 having a curved portion 2 at each end, which abuts at its end at 3 against the body of the vehicle.

The bumper comprises, generally, a metallic backing 4 and a bumper element of non-metallic resilient material, as rubber, mounted on the backing. The backing 4 is formed up in the form of a channel in cross section, as seen in Figure 3, and is provided with suitable means, as brackets 5, 6, for securement to the body of the bus or vehicle. The non-metallic resilient bumper element is mounted on the outer side of the bottom of the channel of the backing 4 and completely covers the outside of the backing. It is formed hollow or semi-tubular with the open side opening toward the backing 4.

The bumper element here illustrated comprises a plurality of, here shown as two, ribs 7 formed with channels 8, which open toward the backing 4, each rib being here shown as formed with two channels 8, so that there is a leg 9 between the channels 8, pressing against the backing 4. The bumper element is also formed with flanges 10 lapping the outer sides of the side flanges of the channel formation of the backing 4 and secured thereto, as by screw bolts 11, extending through the flanges 10 and the side flanges of the channel of the backing 4. Preferably, metallic strips 12 are located between the heads of the screws 11 and the flanges 10. The bumper element is also secured to the backing 4 or the bottom of the channel formation thereof between the ribs, as by screw bolts 13, the heads of which press against metal strips 14. The bumper element, which is preferably formed of extruded rubber of the proper density to give cushion qualities, completely covers the channel-shaped backing 4. The ends of the rubber buffer and the backing are closed by suitable facing members or caps, as the cap 15.

A bumper of this construction is particularly economical in construction, owing the the fact that the rubber bumper element houses the backing, and hence no plating is required for the backing, and owing to the construction of the bumper element, ample cushioning effect is provided without the use of heavy supporting springs for the bumper. Owing to the ribs of the semi-tubular bumper element, the manner of securing the bumper element or ribs in position, maximum resiliency and minimum liability of the bumper breaking away from the metal backing, results.

What I claim is:

1. A bumper comprising an elongated metal, channel-shaped backing having side flanges and an elongated non-metallic resilient bumper element overlying and extending lengthwise of the backing and including parallel ribs extending lengthwise of the backing and having flanges lapping the outer faces of the side flanges of the channel-shaped backing, each of the ribs being formed with a leg extending from the top thereof and pressing against the channel-shaped backing forming a plurality of channels opening toward the backing, and means located between the ribs for securing the backing to the bottom of the channel-shaped backing.

2. A bumper comprising an elongated metal backing strip, a non-metallic bumper element overlying and extending lengthwise of the backing strip, the bumper element being formed with lengthwise parallel channels opening through the face thereof against the backing strip providing a wall or leg separating the channels, the wall engaging and thrusting at its edge against the backing strip, and means located entirely out of the channels for securing said bumper element to the backing strip, the wall serving as a strut between the channels.

ROBT. H. IMHOFE.